June 5, 1928.

W. P. SENG

STEERING WHEEL

Filed July 11, 1921

1,672,137

2 Sheets-Sheet 1

Inventor;
Wendelin P. Seng

By Kent W. Brownell
Atty

June 5, 1928.
W. P. SENG
1,672,137
STEERING WHEEL
Filed July 11, 1921
2 Sheets-Sheet 2
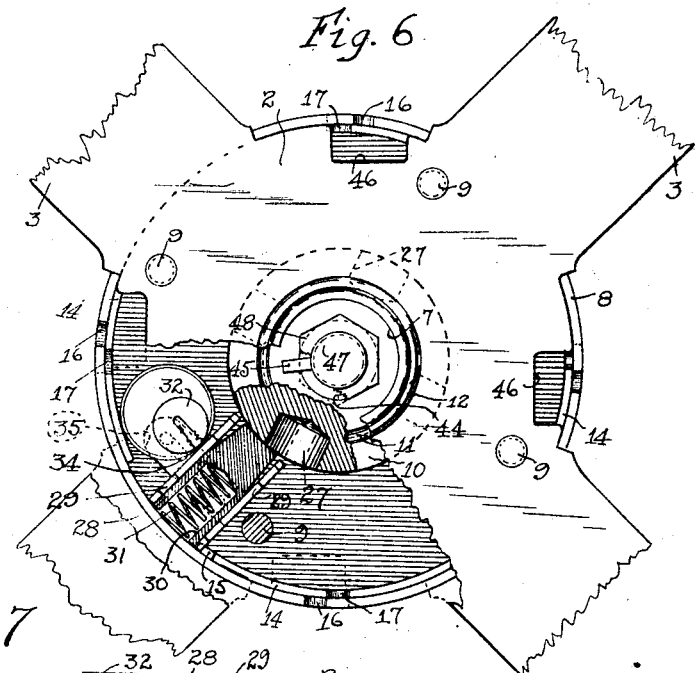

Patented June 5, 1928.

1,672,137

UNITED STATES PATENT OFFICE.

WENDELIN P. SENG, OF WILMETTE, ILLINOIS.

STEERING WHEEL.

Application filed July 11, 1921. Serial No. 483,661.

This invention relates to a steering wheel for automobiles, and is more particularly described as a locking wheel of this type for preventing theft. Among the objects of the invention are: to provide a locking wheel of this type in which the locking parts are formed up out of sheet metal stampings; to provide a symmetrically formed wheel with the locking device at the center; to provide an additional locking ring to prevent unauthorized movement of the wheel; to provide a cap with projecting parts all of which must be torn loose before the cap or the wheel can be removed from the steering column in an unauthorized manner; to provide a locking bolt which is effective in either one of two positions either to lock the wheel to the steering post, or to engage the locking ring; to provide a cover for the gear enclosing cap of a certain type of steering column which prevents access thereto except when the steering wheel is removed; and in general, to produce the construction herein shown and described.

Figure 1:
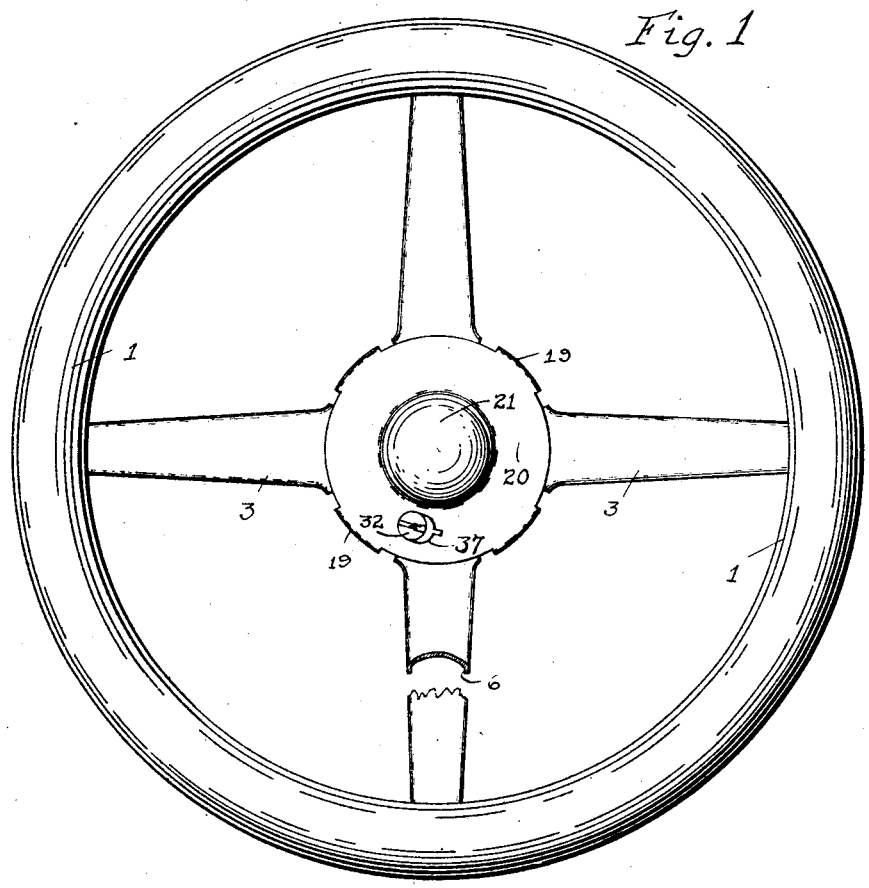
Figure 2:
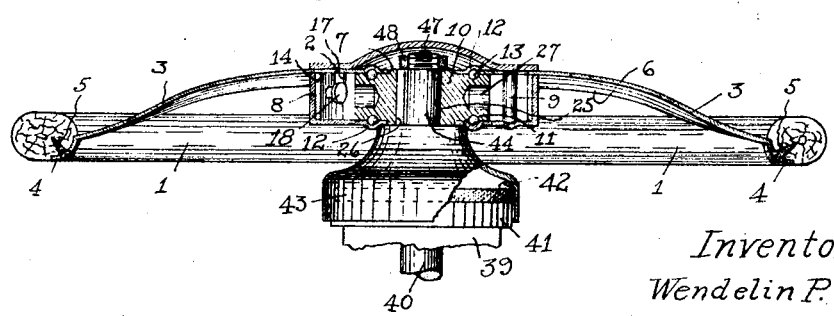

In the accompanying drawings, Fig. 1 is a view of a steering wheel constructed in accordance with the principles of this invention; Fig. 2 is a sectional view of such a wheel; Fig. 3 is a view partly in section of the locking cap; Fig. 4 is a side view of the locking ring; Fig. 5 is a view partly in section of the locking receptacle; Fig. 6 is a plan view with parts shown in section of the locking mechanism and the cover plate which also forms the spokes; and Fig. 7 is a detailed view of the locking mechanism.

This invention provides a steering wheel which may be locked in connection with the steering column for guiding the automobile, or may be locked out of such connection so that the wheel will rotate freely upon the steering column, with the provision of locking means which prevents the unauthorized removal of the steering wheel from the steering column and prevents the disengagement of the locking parts except under the control of a key, or by actually breaking apart the members of which the wheel is constructed.

Referring now more particularly to the drawings, a rim 1 of wood or any other suitable material has connected thereto a plate 2 formed of sheet metal with radiating spokes 3, the extremities 4 of which are seated in suitable recesses at the underside edge of the rim 1 and secured thereto by fastening devices 5. This provides a smooth grip for the wheel with no projections or obstructions.

The spokes 3 are preferably bent downwardly at the edges 6 to increase the strength and rigidity of the plate 2 and the spokes, and also to afford a neater and more pleasing appearance. The central portion of the plate 2 is preferably raised, as shown more clearly in Fig. 2, and formed with a perforation 7. A perforated cup or receptacle 8 also formed of sheet metal is attached to the underside of the plate 2 and is held rigidly in connection therewith by means of rivets 9. Interposed between the plate and the cup and seated by the perforations therein is a hub member 10 which rotates freely within the receptacle. An anti-friction bearing is commonly provided by forming annular grooves 11 at the top and bottom of the hub member 10 in providing the corresponding ridges 12 in the plate 2 and in the bottom of the receptacle 8, and in seating ball bearings 13 in the ball race thus formed.

Before attaching the plate 2 and the receptacle 8 by means of the rivets 9 a locking ring 14 is seated within the receptacle fitting closely but loosely against the outer wall thereof. The locking ring is not a complete circle but has a portion omitted to seat a locking device and one extremity of the ring is formed with a reduced tongue 15 which co-operates with the locking device as hereafter explained.

In the upper edge of the cup or receptacle 8 are a number of spaced bayonet slots 16, and in the upper edge of the locking ring 14 are corresponding straight slots 17 of the same depth as the bayonet slot. These slots 16 and 17 are adapted to seat locking rivets 18 therein, the rivets being carried by downward projections 19 of a locking cap 20 which fits over the central or hub portion of the plate 2, the projections 19 fitting closely over the outside of the receptacle 8. When the slots 16 and 17 are in alinement, the rivets 18 are inserted by means of the cap to the bottom of the slots, and the cap is given a turn which engages the rivet in the angular portion of the bayonet slot, the locking ring 14 at this time being moved over with the rivet so that if the locking ring is held in this position, the rivets cannot be disengaged from the bayonet slot 16. In this position the cap 20 fits down closely over the plate 2 and with its raised center 21 forms a neat and finished appearance. The inner end of each fastening device or rivet 18 may be provided with a head 22, and the outer end extends through and is made flush with the outer face of the projection 19, so that in order to disengage the cap from the receptacle 8 it is necessary to bend up all the projections 19 or cut off all the fastening rivets thereof, unless the locking ring 17 is moved in the authorized manner.

In order to hold the cap 20 against chattering a fastening screw 23 may be inserted through one or more of the projections 19 into a suitable hole 24 of the cup 8, and of course this fastening means would be removed before the cap could be turned in the ordinary manner for removing it.

In the hub member 10 is a shaft opening 25 and a key way 26 for the attachment of a shaft thereto, and in the sides are a plurality of locking recesses 27. Disposed in the cup 8 between the hub member and the outer wall of the cup is a locking bolt 28 having side supports 29 secured to the bottom of the cup and to the top plate 2 which covers it. The rear end of the locking bolt is formed with a recess 30 in which is a spring 31 tending to press the forward end of the bolt into engagement with any one of the locking recesses 27, and at one side of the locking bolt is a key controlled lock 32 of any well known type having a movable projection 33 to engage in a slot 34 of a plate 35 which is attached to the locking bolt by fastening screws 36 so that as the movable part of the lock is turned with a key, the bolt 28 may be moved into or out of locking engagement with any one of the recesses 27 which happens to register therewith. In the cover 20 there is a recess 37 through which a key may be inserted for operating the lock and locking bolt, the opening being elongated to allow the key to remain in when the cover is turned.

It will be evident that when the locking bolt 28 is in engagement with any one of the locking recesses 27, the steering wheel will be locked in steering engagement with the hub member 10, but when the locking bolt 28 is drawn back, as shown in Fig. 6, the steering wheel will rotate free upon the steering shaft and cannot be removed except in an authorized manner without disrupting the parts.

One of the side supports 29 is formed with an opening 38 through which the tongue 15 of the locking ring 14 extends to engage the extremity of the locking bolt 28 in its retracted position, as shown more clearly in Fig. 7. In this position the locking ring cannot be rotated relatively to the bayonet slots 16 and therefore the cap 20 cannot be disengaged. In order to remove the cap the locking bolt is first engaged with one of the locking recesses 27, the fastening means 23 is removed from the projection 19 and the cap 20 is turned together with the locking rings 14 so that the slots 17 register with the straight portion of the bayonet slot 16. In this position the tongue 15 of the locking ring will extend still further into the opening 38 and the cap 20 can be lifted from the steering wheel for adjustment or repair of the parts, or when placing the steering wheel in position.

At the top of the steering column there may be a housing 39 for gears connected to a steering shaft 40 and this housing is commonly provided with a lid 41 which is held in place by a screw 42. To provide access to the housing, and to prevent removal of the lid, a cover 43 is provided which extends over the edge of the lid 41 and abuts the under side of the receptacle 8 which is seated closely thereon to prevent lost motion or play, and the consequent rattling of the parts.

In placing this steering wheel in position, the cover 43 is placed over the lid 41, the assembled steering wheel without the cap 20 is mounted upon a short shaft 44 which projects above the lid 41, secured thereto by means of a key 45, the locking bolt 28 being engaged with one of the locking recesses 27. In the hub portion of the plate 2 are recesses 46 corresponding to the alined position of the slots 16 and 17, so that when the steering wheel is attached to the shaft 44 the cap 20 can be placed in position, the fastening rivets 18 being inserted through the recesses 46 in engagement with the slots 16 and 17. The cap is then given a slight turn to engage the locking members 18 with the bayonet slots 16 after which the fastening device 23 is placed in position and the wheel is ready for use. At the top of the shaft 44 which is commonly formed with a reduced threaded portion 47, a lock nut 48 is attached. This lock nut of course holds the steering wheel in position on the shaft and the cap 20 must be removed to afford access to the lock nut.

In removing the steering wheel the portions above described are reversed and it is apparent that in order to substitute this wheel for any other kind it is necessary only to remove the other wheel and substitute this one in place thereof.

I claim:

1. A steering wheel comprising a rim, a central sheet metal stamping and spokes radiating therefrom secured to the rim, and means for locking the central part of the stamping to a steering wheel post, said means including a cup member secured under said central part of the stamping and a radially moving locking member contained in the cup and protected by it and said stamping.

2. The combination with a steering wheel and a supporting post therefor, the wheel comprising a central sheet metal stamping and spokes radiating therefrom secured to the wheel rim, locking means for attaching the wheel stamping to the post, and a sheet metal cap extending over the stamping to prevent unauthorized access to the locking means.

3. A steering wheel adapted to be attached to a steering post, comprising a cup member securable to the post and a cap member extending over the top of the post and downwardly over the sides of the cup and having inward projections extending through the sides of the cup for attaching it thereto.

4. In a steering wheel, a central plate with radiating spokes, a cup member secured to the underside thereof, a steering post extending through the plate and means for attaching it thereto, and a cap extending over the central portion of the plate covering the said means and engaging with the cup to prevent removal of the wheel from the post.

5. The combination with a steering wheel and a supporting post therefor, of means for mounting the wheel for free rotation, said means including a hub member secured to the post, a sheet metal casing separate from the wheel hub and comprising interlocking members enclosing the wheel hub and the said hub member from above and below, and a lock operated bolt movable in the casing for engaging the hub member to operate the steering post and the wheel.

6. In a steering wheel of the class described, a plate having radiating spokes, a receptacle on one side of the plate having bayonet slots, and a cap extending over the other side of the plate at the center with projections between the spokes engageable with the slots of the receptacle.

7. In a steering wheel, a cup member, a steering post, means for attaching the cup to the post, and a cap extending over the central portion of the cup covering said post and enclosing the attaching means, and means projecting from the cap for engagement through the sides of the cup to prevent removal of the cap from the cup member.

8. In a steering wheel of the class described, a receptacle adapted to be attached to a steering post and having bayonet slots in its sides, and a cap extending over the receptacle and downwardly over its sides with inward projections engageable in the said slots.

9. In a steering wheel, a central plate having radiating spokes, a cup member at one side of the plate having bayonet slots, a cap extending over the other side of the plate with projections engaging in the bayonet slots, and a locking ring disposed within the cap having straight slots which prevent the disengagement of the cap projections unless the locking ring is turned.

10. In a steering wheel, a central plate having radiating spokes, a cup member at one side of the plate having bayonet slots, a cap extending over the other side of the plate with projections engaging in the bayonet slots, a locking ring disposed within the cap having straight slots which prevent the disengagement of the cap projections unless the locking ring is turned, and means for controlling the movement of the locking ring.

11. In a lock steering wheel, the combination with a hub member having external recesses, a receptacle in which the hub is mounted, a cap having a bayonet joint engagement with the receptacle, a locking ring within the receptacle for controlling the engagement of the cap, and a slidable bolt engaging the locking ring in one position and to engage any one of the hub member recesses in the other position.

12. In a steering wheel, a hub member having radiating external recesses, a receptacle therefor comprising a plate with radiating spokes and a cup secured to the plate and provided with bayonet slots in the edges between the spokes, a locking ring within the receptacle having straight slots in the edges, a locking cap extending over the central portion of the plate and with projections to engage the bayonet slots and the slots of the locking ring, and a locking bolt to engage the locking ring to prevent disengagement of the cap, in one position, and to engage one of the hub member recesses to lock the receptacle to the hub in another position.

13. The combination with a steering shaft, of a hub member removably attached to the upper end, a steering wheel comprising a central hub part through which the shaft extends, a casing composed of separate parts fitting above and below the hub member and extending over the end of the shaft, and the casing parts being interlocked for enclosing the hub part of the wheel and the hub member and rotating freely with the wheel on the hub member, and locking means also contained in the casing operative to connect it with the hub member.

14. The combination with a steering post and an attached hub member, of a steering wheel comprising a hub and spokes extending therefrom, a casing with cooperating parts extending and interlocked between the spokes to enclose the hub member and the steering wheel hub from above and below and freely rotatable upon the hub member, and locking means also enclosed in the casing operative to connect it with the hub member for rotating the shaft with the wheel.

15. In a lock steering wheel, a hub member, a receptacle therefor comprising a plate with radiating spokes and a cup secured thereto, means for connecting the receptacle and the hub member comprising a locking bolt, a pair of supports therefor attached to the cup and plate, an arm projecting from the locking bolt and a rotatable lock member engaging the arm to move it and to move the bolt into and out of engagement with the hub member.

16. In a lock steering wheel, a hub member with radiating lock recesses adpated to be secured to a steering post, a receptacle in which the hub member is freely rotatable, a cap having pin and slot connection with the receptacle and extending over the upper end of the steering post, a locking ring to control the pin and slot connection, and a bolt engageable with one of the recesses of the hub member to rotate the shaft by means of the wheel and in this position permitting the disengaging movement of the locking ring, and in its retracted position to permit the free rotation of the wheel and preventing the disengaging movement of the locking ring.

17. In a lock steering wheel, a hub member having outer recesses, a shaft to which the hub member is keyed, and a locking nut to prevent the disengagement of the hub member from the shaft, a receptacle in which the hub member is freely rotatable comprising a plate with radiating arms and a cup with locking slots between the arms, a cap extending over the lock nut with projections engaging in the lock slots of the cap, a locking ring for controlling the engagement of the projections and the lock slots, locking means within the receptacle for connecting it to the hub member and for preventing the disconnecting movement of the lock ring, and a rim secured to the projecting extremities of the said plate.

18. In a steering wheel, a hub member adapted to be secured to a steering post, a receptacle in which the hub member is rotatable and comprising a plate with radiating spokes, locking means for connecting the receptacle to the hub member, and a cap having projections to engage in the side of the receptacle between the spokes and having limited rotation for such engagement and having an elongated aperture in the top thereof for the insertion of the key to control said locking means in any rotated position of the cap.

19. A steering wheel for attachment to a steering post comprising a cup member attachable to the steering post, spokes radiating therefrom and a cap member extending over the top of the post with projections extending inwardly between the spokes and engaging in the sides of the cup member.

20. A steering wheel for automobiles comprising a member adapted to be attached to a steering post, a sheet metal enclosure for said member including a cap extending over the top of the post and the enclosure, the cap member having projections which extend inwardly between the spokes, and means for engaging said projections to lock the cap in place.

21. In a steering wheel, a central hollow hub member adapted to surround a steering post, and a cap member extending over the top of the hub member to cover the upper end of a steering post and having downward extensions between the spokes with inward projections to engage in the slots in the side of the hub member.

22. In a steering wheel, a hub member and radiating spokes, a cap extending over the top of the hub member and means for engaging the cap with the hub member, the said means including a bayonet joint and a locking ring disposed within the hub member and engaging the cap to prevent its removal.

23. In a steering wheel, a cup member adapted to be releasably connected to a steering post, a locking ring fitting closely within the cup member, the members having registering slots and those of one of them being bayonet slots, and a cap member extending over the cup and the sides thereof and having projections engaged by the slots of both members.

24. In a steering wheel, a cup member having bayonet slots, a cap extending over the cup having projections engaging in the slots, and a locking ring in the cup with straight slots engaging the projections and movable to prevent disengagement thereof from the bayonet slots.

25. In a steering wheel, a cup member adapted to be attached to a steering post, a locking ring fitting closely within the cup member, the members having registering slots and those of one of them being bayonet slots, a cap extending over the cup and the sides thereof and having projections engaged by the slots of both members, and means for controlling the movement of the locking ring after the cap is in position on the cup to prevent unauthorized removal of the cap.

26. In a steering wheel, a member adapted to be attached to a steering post, a cup freely engaging the member at top and bottom, a slidable bolt to connect the cup and member, a cap insertable over the cup and having engagement therewith, and means controlled by the sliding bolt and including a locking ring movable in the cup for locking the cap in place on the cup.

27. In a steering wheel, a hub member adapted to be inserted over and attached to a steering post, a covered cup member freely engaging the hub member at top and bottom, a slidable bolt to connect the cup and hub member, a key controlled lock for controlling the operation of the bolt, a cap extending entirely over the top of the cup and projections for engaging through the sides of the cup and with a key aperture in the top for said lock, and means controlled by the sliding bolt including a locking ring movable in the cup for engaging the projections of the cap to lock it in place on the cup.

WENDELIN P. SENG.